Dec. 13, 1938.   J. G. FORD ET AL   2,139,948
DIELECTRIC LIQUID FOR ELECTRICAL APPARATUS
Filed March 30, 1937   6 Sheets-Sheet 1

WITNESSES:

INVENTORS
James G. Ford and
Charles F. Hill.
BY
ATTORNEY

Dec. 13, 1938.   J. G. FORD ET AL   2,139,948
DIELECTRIC LIQUID FOR ELECTRICAL APPARATUS
Filed March 30, 1937   6 Sheets-Sheet 3

WITNESSES:

INVENTORS
James G. Ford and
Charles F. Hill.
BY
ATTORNEY

Dec. 13, 1938.  J. G. FORD ET AL  2,139,948

DIELECTRIC LIQUID FOR ELECTRICAL APPARATUS

Filed March 30, 1937  6 Sheets-Sheet 4

WITNESSES:

INVENTORS
James G. Ford and
Charles F. Hill.
BY
ATTORNEY

Dec. 13, 1938.   J. G. FORD ET AL   2,139,948
DIELECTRIC LIQUID FOR ELECTRICAL APPARATUS
Filed March 30, 1937   6 Sheets-Sheet 6

Pentachlordiphenyl Isomers with stated percentages of 70-30 mixtures of Pentachlorethylbenzene and Tetrachlorethylbenzene Isomers.

Fig. 12.

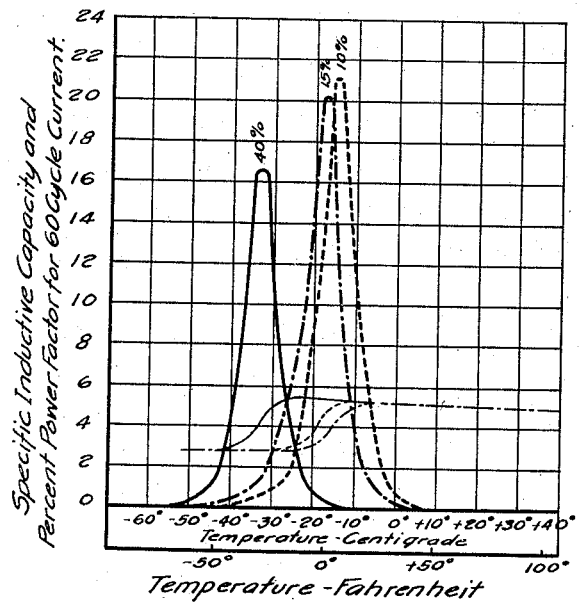

Temperature for Maximum Power Factor of mixtures of Tetrachlorethylbenzene Isomers and Pentachlorethylbenzene mixture and Isomeric Pentachlordiphenyl for 60 Cycle Current.

Fig. 13.

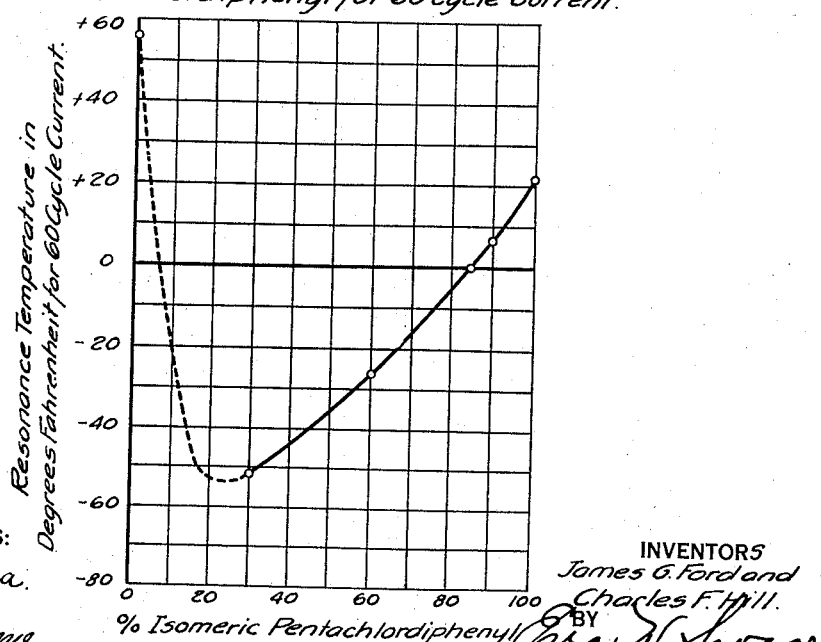

WITNESSES:

INVENTORS
James G. Ford and
Charles F. Hill.
BY
ATTORNEY

Patented Dec. 13, 1938

2,139,948

UNITED STATES PATENT OFFICE 2,139,948

DIELECTRIC LIQUID FOR ELECTRICAL APPARATUS

James G. Ford, Forest Hills, and Charles F. Hill, Edgewood, Pa., assignors to Westinghouse Electric & Manufacturing Company, East Pittsburgh, Pa., a corporation of Pennsylvania Application March 30, 1937, Serial No. 133,925

30 Claims. (Cl. 252—1)

The invention relates to dielectric liquids for electrical apparatus and the insulating of the electrical apparatus, and this application is a continuation-in-part of applications Serial Nos. 53,094 and 53,095.

The object of the invention is to provide a dielectric liquid for electrical apparatus which is stable under storage and operating conditions, and which is fireproof and when decomposed electrically produces a substantially incombustible gas.

It is also an object of the invention to provide a dielectric liquid for electrical apparatus which has a low viscosity over a wide range of temperatures enabling its use under the ordinary temperature conditions to which electrical apparatus may be subjected.

A further object of the invention is to provide for insulating electrical apparatus with a dielectric which on decomposition by an electric arc generates a substantially incombustible gas.

For a fuller understanding of the nature and objects of the invention, reference may be had to the following detailed description taken in conjunction with the accompanying drawings, in which.

Figure 1:
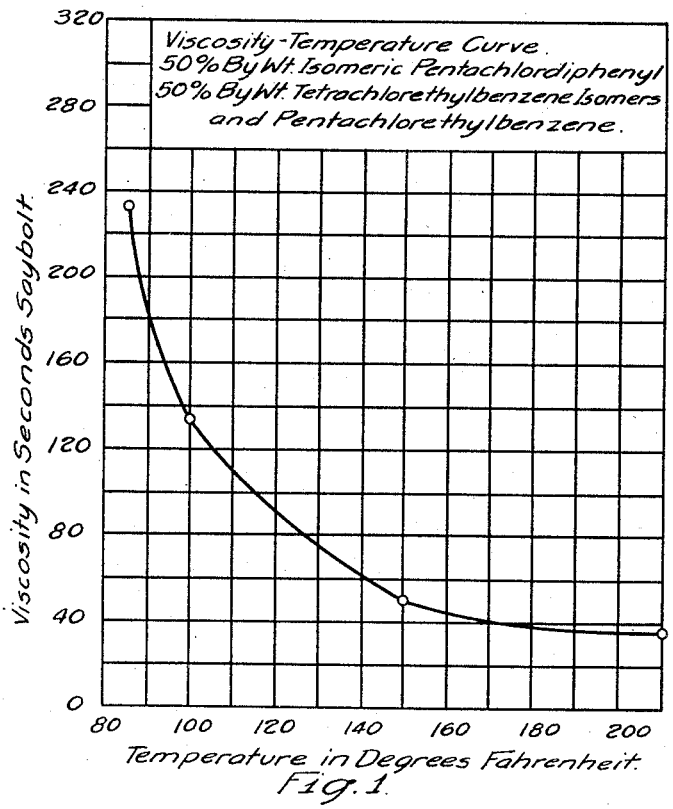
Figure 1 is a graph plotted to show the viscosity at different temperatures of a mixture of 50% by weight ethyl-tetrachlorbenzene and ethyl-pentachlorbenzene and 50% by weight chlorinated diphenyl.
Figure 2:
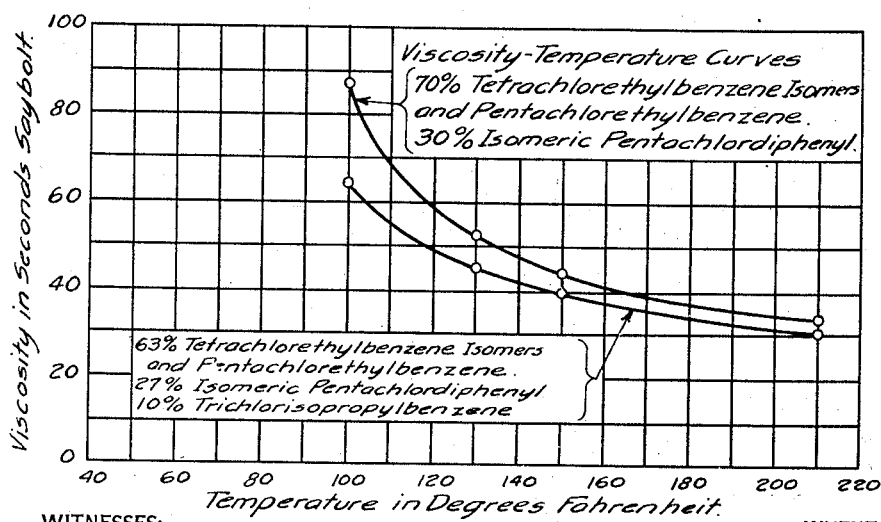
Figs. 2 and 3 are graphs showing change of viscosity with temperature for dielectric liquids prepared in accordance with this invention.
Figure 3:
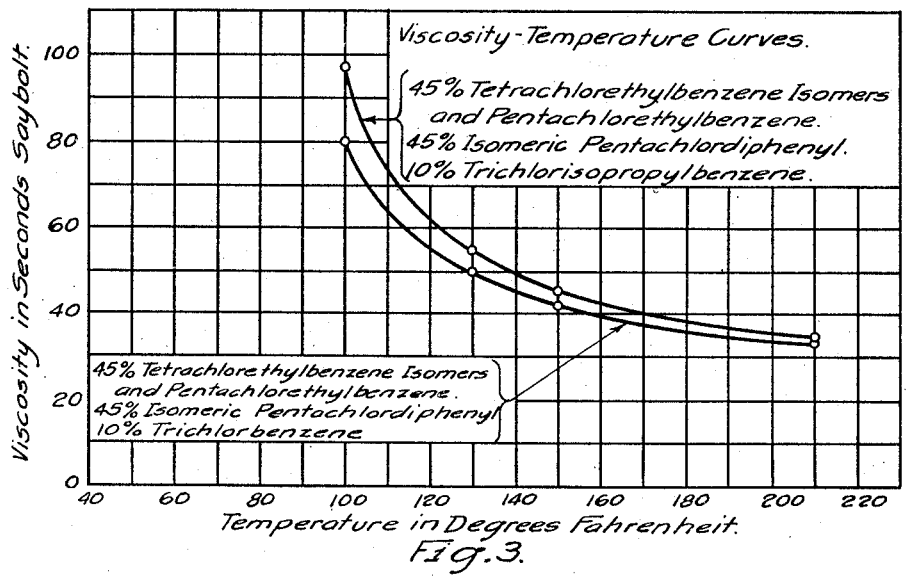

Fig. 12 is a graph showing the specific inductive capacity and percent power factor for 60-cycle current plotted on temperature in both degrees centigrade and Fahrenheit for different mixtures of the dielectric liquid employed in the construction of the electrical apparatus; and Fig. 13 is a graph showing the resonant temperatures of different mixtures of ethyl-tetrachlorbenzene and ethyl-pentachlorbenzene and pentachlordiphenyl.

In the present state of the electrical art, manufacturers of electrical apparatus are constantly being required to supply for transformers, reactors, regulators, circuit breakers, capacitors and similar apparatus, dielectric liquids which are non-inflammable and which when decomposed by an electric arc produce an incombustible or substantially incombustible gas. This demand by the trade and the requirements as to operating characteristics, have to be considered when supplying a dielectric for electrical apparatus.

In order to produce efficient apparatus which will meet all the ordinary operating conditions to which electrical apparatus may be subjected, the dielectric liquid employed should have a low freezing point, since in outside use transformers, capacitors, reactors, and switches may be subjected to temperatures ranging from −25° F. to 200° F. When the dielectric liquid is used in transformers for cooling purposes, it must have a low viscosity to facilitate circulation by pumping or convection currents to effect the required heat transfer. In order to avoid excessive expense and maintenance, the dielectric liquid should have high chemical stability, a low evaporation rate and capacity to resist deterioration when exposed to light.

Dielectric liquids to be employed in capacitors should have a low direct-current conductivity, a low electrical power factor, high dielectric strength, and a high dielectric constant. Further, it should not corrode the metals employed in the manufacture of electrical apparatus.

The dielectric liquid which we have invented meets all the requirements recited hereinbefore. In addition, it may be produced in desired quantities and at a cost which will permit its extensive use.

The base of our dielectric liquid comprises ethyl-tetrachlorbenzene and ethyl-pentachlorbenzene. The ethyl-tetrachlorbenzene employed will comprise one or more of its isomers. These benzene derivatives may be produced in any suitable manner well known to the art.

One method of manufacturing the base liquid which has been found satisfactory is to produce ethyl-benzene by what is known as the Friedel-Crafts synthesis, which comprises reacting benzene with a source of the ethyl group such as ethylchloride or ethylene in the presence of a Friedel-Crafts catalyst such as aluminum chloride or ferric chloride. The ethylbenzene may be chlorinated by some suitable chlorination process such as bubbling chlorine through it.

In the chlorination of ethylbenzene, the process will be stopped when some predetermined relation between the ethyl-tetrachlorbenzene and ethyl-pentachlorbenzene has been obtained. The proper point at which to stop the chlorination process may be arrived at by such methods as density tests, which are well known in the art and so will not be described.

In making our dielectric liquid, we may either use ethyl-tetrachlorbenzene or ethyl-pentachlorbenzene with other ingredients, but it adds to the difficulty and expense of production. Accordingly, in the preferred form of our invention, we employ a mixture of ethyl-tetrachlorbenzene and ethyl-pentachlorbenzene as the base for our dielectric. The ratio of ethyl-tetrachlorbenzene and ethyl-pentachlorbenzene will depend to some extent on the conditions that are to be imposed on the dielectric liquid. In general, the base of the dielectric liquid will be predominately ethyl-pentachlorbenzene, which has slightly better electrical properties than ethyl-tetrachlorbenzene.

In the chlorination of ethylbenzene to produce ethyl-tetrachlorbenzene and ethyl-pentachlorbenzene, most of the processes that may be employed involve the bubbling of chlorine gas through the liquid to be chlorinated. When a bubbling process is utilized the chlorination will progress rapidly and efficiently for a time. However, as the quantity of ethyl-pentachlorbenzene increases, the chlorination will proceed more slowly, and therefore, less efficiently and the cost will increase.

We have found that ethyl-pentachlorbenzene has excellent electrical properties such as low power factor, high ohmic resistance, high dielectric constant and a freezing point around 135° F. Ethyl-tetrachlorbenzene, a term which we are employing for either one or more of its isomers, does not have quite as good electrical characteristics as ethyl-pentachlorbenzene, but it is substantially non-inflammable and remains liquid at ordinary atmospheric temperatures.

In preparing our base liquid, we have found that we may add from 10% to 50% by weight of ethyl-tetrachlorbenzene to ethyl-pentachlorbenzene without appreciable loss in the good electrical characteristics of ethyl-pentachlorbenzene, and the freezing point of the resulting mixture will range from about 95° F. to 50° F.

In the preferred embodiment of our dielectric liquid, we employ a base liquid comprising about 20% to 30% by weight ethyl-tetrachlorbenzene and 80% to 70% by weight ethyl-pentachlorbenzene because of the good characteristics which this mixture or blend possesses and the economy with which it may be produced. For some applications, ethyl-tetrachlorbenzene, which is substantially non-inflammable and which has good freezing characteristics, may be used in much higher proportions, as, for example, 80% by weight to 20% by weight of ethyl-pentachlorbenzene. In some instances, ethyl-tetrachlorbenzene may be used alone as the base liquid.

In the preferred embodiment of our invention, in order to further depress the freezing point, we add chlorinated diphenyl to the base liquid comprising ethyl-tetrachlorbenzene and ethyl-pentachlorbenzene. The chlorinated diphenyl sold to the trade generally consists of isomeric mixtures containing from 1 to 9 chlorine atoms, depending upon the degree of chlorination and fractionation required. In the making of our dielectric liquids isomeric mixtures containing on an average of from 5 to 7 chlorine atoms per molecule, for example, pentachlordiphenyl, hexachlordiphenyl and heptachlordiphenyl are selected. Therefore, when the term chlorinated diphenyl is employed, it is intended to include the isomers.

Chlorinated diphenyl is employed because it has good electrical characteristics and is not readily volatilized at operating temperatures. The addition of the chlorinated diphenyl so depresses the freezing point, that the resulting dielectric liquid may be employed in electrical apparatus which during use is subjected to a wide range of temperature.

The chlorinated diphenyl employed will preferably be an isomeric mixture of pentachlordiphenyl and hexachlordiphenyl. Irrespective of the diphenyl compound employed, it should contain from 45% to 65% chlorine by weight. While the amount of chlorine may be varied, the chlorinated diphenyl which is suitable for most applications should contain about 55% to 60% by weight of chlorine.

Figure 6:
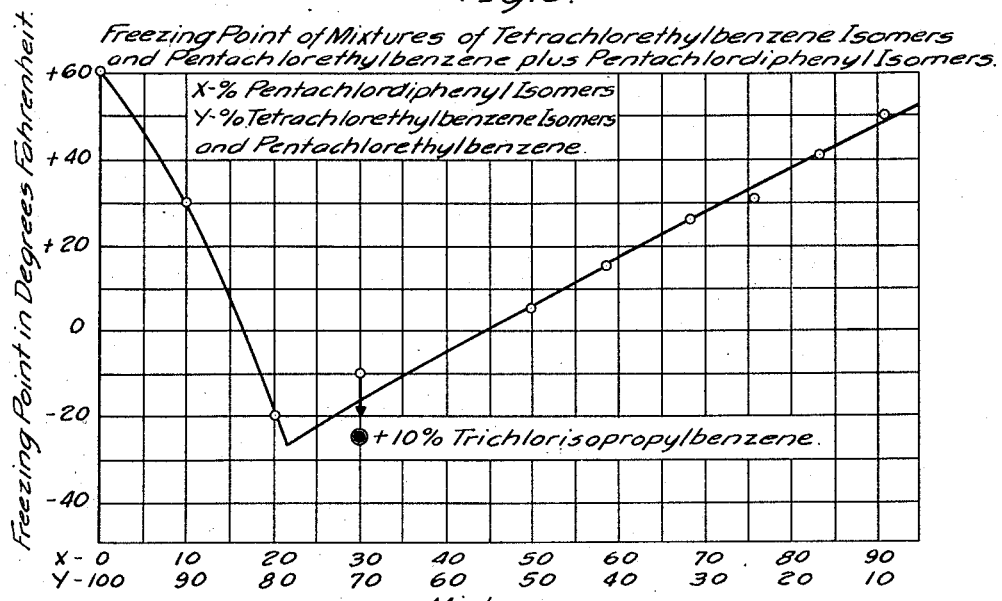
Figure 7:
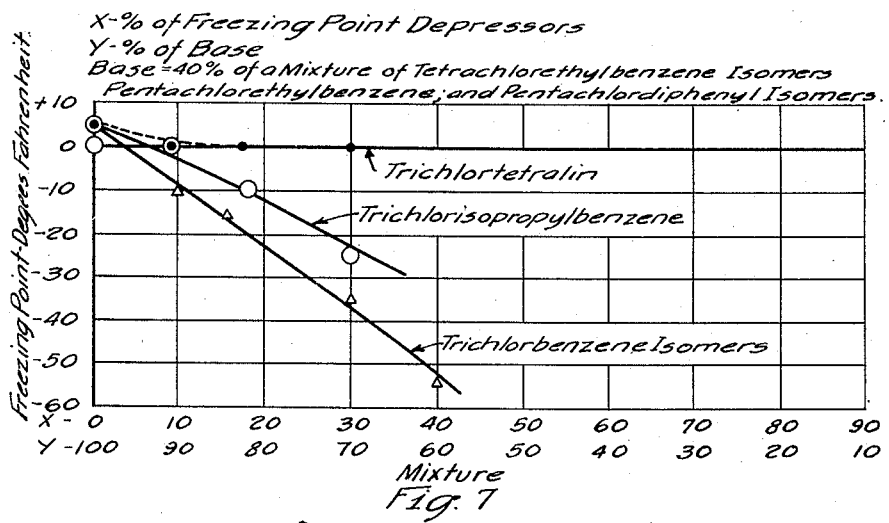
Fig. 7 is a graph showing how the addition of freezing point depressors to a blend of ethyl-pentachlorbenzene, ethyl-tetrachlorbenzene and chlorinated diphenyl affects the freezing characteristics.

In the graph in Fig. 6, it will be observed that a mixture of 22% by weight of chlorinated diphenyl with 78% by weight of a base liquid containing 30% by weight ethyl-tetrachlorbenzene and 70% by weight ethyl-pentachlorbenzene will have a freezing point of about −25° F. and the same mixture will not boil below 536° F. This gives a range of temperatures that will cover all ordinary operating conditions.

Figure 4:
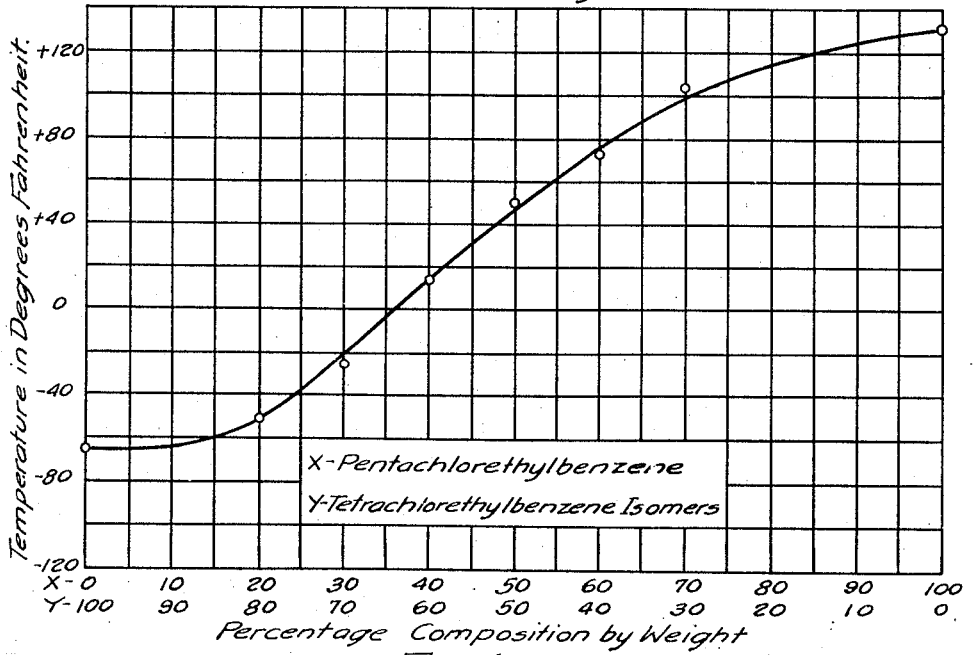
Fig. 4 is a graph showing the effect of varying the percentages of ethyl-tetrachlorbenzene and ethyl-pentachlorbenzene in the base liquid prepared in accordance with this invention.

Reference to Fig. 4 will reveal that the freezing point of the base liquid varies with the percentages of ethyl-tetrachlorbenzene and ethyl-pentachlorbenzene. As the percentage of ethyl-tetrachlorbenzene is increased, the freezing point is depressed. Therefore, by properly selecting the percentages of ethyl-tetrachlorbenzene and ethyl-pentachlorbenzene, any predetermined freezing point within the range of temperatures indicated in the graph in Fig. 4 may be obtained.

Figure 5:
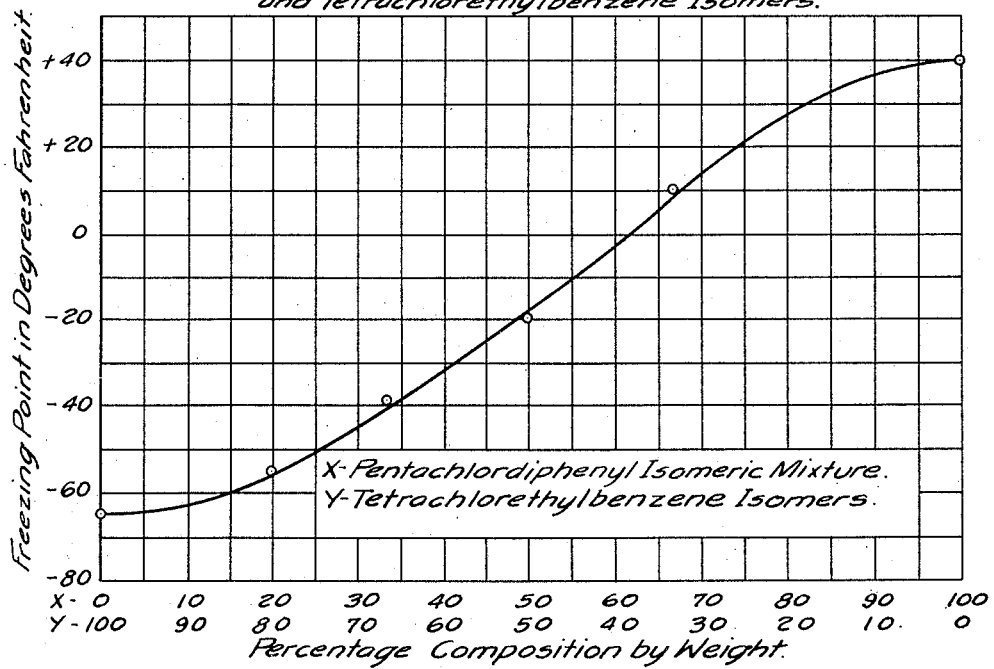
Figs. 5 and 6 are graphs showing the freezing characteristics of our dielectric liquid.

The graph of Fig. 5 shows that a dielectric liquid comprising 80% by weight of the base liquid made up of a mixture of 70% by weight ethyl-tetrachlorbenzene isomers, 30% by weight ethyl-pentachlorbenzene, with 20% by weight of pentachlordiphenyl isomers has a freezing point of about −50° F. The ingredients of this dielectric mixture all have good electrical properties, and so the mixture has good electrical properties. Since the power factor of ethyl-pentachlorbenzene is somewhat better than the power factor for ethyl-tetrachlorbenzene, for applications where it is desired to have a good power factor, it is preferable to employ a base mixture having a high percentage of ethyl-pentachlorbenzene.

The amount of chlorinated diphenyl employed in the dielectric liquid may be varied within wide ranges to produce dielectric liquids that will be suitable for the uses proposed in this specification. The dielectric liquids employed for most purposes will comprise 70% to 30% by weight of the base liquid comprising ethyl-tetrachlorbenzene and ethyl-pentachlorbenzene mixed with from 30% to 70% by weight chlorinated diphenyl.

Four examples of our dielectric liquid containing different percentages of the ingredients which have been tested and found to give good characteristics are as follows:

*Example No. 1*

| | Per cent by weight |
|---|---|
| Ethyl-tetrachlorbenzene isomers | 14 |
| Ethyl-pentachlorbenzene | 56 |
| Pentachlordiphenyl isomers | 30 |

Tests made on this dielectric liquid show that it has a freezing point of −15° F., a flash point of 355° F., a boiling point of 590° F., a power factor of .02% and that it will not burn at the boiling point.

*Example No. 2*

| | Per cent by weight |
|---|---|
| Ethyl-tetrachlorbenzene isomers | 9 |
| Ethyl-pentachlorbenzene | 36 |
| Pentachlordiphenyl isomers | 55 |

The above described dielectric liquid has a freezing point of 10° F., a flash point of 360° F., boils at 600° F., a power factor of .02% and no fire point.

*Example No. 3*

| | Per cent by weight |
|---|---|
| Ethyl-tetrachlorbenzene isomers | 56 |
| Ethyl-pentachlorbenzene | 24 |
| Pentachlordiphenyl isomers | 20 |

This dielectric liquid has a freezing point of −50° F., a flash point of about 315° F., boils at about 530° F., a power factor of 0.1% and no fire point.

*Example No. 4*

| | Per cent by weight |
|---|---|
| Ethyl-tetrachlorbenzene isomers | 46 |
| Ethyl-pentachlorbenzene | 20 |
| Pentachlordiphenyl isomers | 34 |

The above mixture has a freezing point of −35° F., a flash point of about 325° F., boils at about 540° F., a power factor of .08% and no fire point.

For many purposes, it may be desirable to provide dielectric liquids with a freezing point lower than that which may be obtained by employing the above mixtures of ethyl-tetrachlorbenzene, ethyl-pentachlorbenzene and chlorinated diphenyl. In such cases, liquids which are classed freezing point depressors are added.

Good results have been obtained by adding to the dielectric liquids described hereinbefore 10% to 25% by weight of one or more of aryltrichlortetralin and the chlorinated alkyl derivatives of benzene in which the alkyl side chain is saturated, or 5% to 40% by weight trichlorbenzene. The chlorinated alkyl derivatives of benzene that have been found to be satisfactory are isopropyl-trichlorbenzene, amyl-pentachlorbenzene, amyl-trichlorbenzene isomers, amyl-tetrachlorbenzene isomers, tertiarybutyl-chlorbenzenes (for example, butyl-trichlorbenzene isomers, butyl-tetrachlorbenzene isomers and butyl-pentachlorbenzene), isopropyl-pentachlorbenzene, isopropyl-tetrachlorbenzene isomers, ethyl-trichlorbenzene isomers and trichlortoluene isomers.

In using the chlorinated alkyl derivatives of benzene where the chlorine is attached to the carbon in the ring, there should not be more than six or seven carbon atoms in the side chain. If this limit of carbon atoms is exceeded, the quantity of the chlorinated alkyl derivatives of benzene added as a freezing point depressor will have to be reduced to compensate for the number of carbon atoms in order to assure the obtaining of a substantially incombustible gas if the dielectric is decomposed by an electric arc. It has been found preferable to work with chlorinated alkyl derivatives of benzene having fewer than six or seven carbon atoms in the side chain because then it is not necessary to watch with as great care the quantity of the derivatives added.

In this connection, it is preferable to employ ethyl-trichlorbenzene isomers or trichlortoluene isomers since they have a smaller number of carbon atoms in the side chain. As is well known, ethyl-trichlorbenzene has only two carbon atoms in the side chain and trichlortoluene has only one. Therefore, these chlorinated derivatives of benzene are highly suitable for use as freezing point depressors.

Trichlorbenzene is not entirely satisfactory as a freezing point depressor in dielectric liquids since it has a high power factor, evaporates quickly and is affected by exposure to light. However, as opposed to these objectionable features, trichlorbenzene is not expensive and so when employed in fairly large quantities the cost of the dielectric liquid is lowered. When dielectric liquids are used in large amounts this is an important consideration. When power factor, evaporation and exposure to light are the main considerations, it is highly advisable to keep the amount of trichlorbenzene as low as the particular application will permit. Nevertheless, we have found that for general use from 5% to 40% by weight trichlorbenzene may be utilized. Above 30% the power factor begins to increase fairly rapidly and while as high as 40% by weight may be employed in the interest of the reduction of cost, there is some danger of crystallization at some sub-normal temperatures. When crystallization occurs, the cooling effect is lost because of the solidification, especially in outdoor applications.

Examples of satisfactory dielectric liquids in which freezing point depressors are employed are as follows:

| | Percent by weight |
|---|---|
| Etheyl-tetrachlorbenzene isomers | 12.6 |
| Ethyl-pentachlorbenzene | 50.4 |
| Pentachlordiphenyl isomers | 27 |
| Isopropyl-trichlorbenzene | 10 |

This dielectric liquid has a freezing point of −25° F., a flash point of 315° F., boils at 560° F., and has no fire point. The power factor for 60-cycle alternating current at room temperature is about .1% and at 80 C. about 4.5%.

Another dielectric liquid having the same ingredients but in different percentages is as follows:

| | Percent by weight |
|---|---|
| Ethyl-tetrachlorbenzene isomers | 9 |
| Ethyl-pentachlorbenzene | 36 |
| Ethyl-pentachlordiphenyl isomers | 45 |
| Isopropyl-trichlorbenzene | 10 |

This dielectric has a freezing point of −15° F., a flash point of 340° F., boils at 595° F. and no fire point. The power factor for 60-cycle alternating current is about .1% at room temperature and about 4.5% at 80° C. Dielectric liquids comprising different percentages of our preferred ingredients and trichlorbenzene as a freezing point depressor have been prepared. A good example is as follows:

| | Percent by weight |
|---|---|
| Ethyl-tetrachlorbenzene isomers | 9 |
| Ethyl-pentachlorbenzene | 36 |
| Pentachlordiphenyl isomers | 45 |
| Trichlorbenzene isomers | 10 |

This dielectric liquid has a freezing point of −15° F., a flash point of 310° F., boils at 540° F., and has no fire point. The power factor for 60-cycle alternating current is about .2% at room temperature and about 5% at 80° C.

As pointed out hereinbefore, our preferred dielectric liquid comprising our base liquid and chlorinated diphenyl has been prepared with the mixture of freezing point depressors. The following is an example of the satisfactory dielectric liquid containing more than one freezing point depressor:

| | Percent by weight |
|---|---|
| Ethyl-tetrachlorbenzene isomers | 4.9 |
| Ethyl-pentachlorbenzene | 19.4 |
| Pentachlordiphenyl isomers | 56.7 |
| Aryltrichlortetralin | 10 |
| Isopropyl-trichlorbenzene | 9 |

Tests on this dielectric liquid reveal that it has a freezing point of −25° F., a flash point of 315° F., boils at 565° F., and no fire point. The power factor for 60-cycle alternating current at room temperature is about .2% and at 80° C. about 5%.

In view of the examples to follow a statement on the term "freezing point" as used in this specification will be made. Throughout this specification where the freezing point is given in the examples, it has been determined by the American Society for Testing Materials method for pour test of hydrocarbon oils, in general, the halogenated mixtures of hydrocarbons are supercooled liquids and may gradually crystallize if maintained at a temperature somewhat above their apparent freezing points. The initial temperature for crystallization, in general, for these liquids is in the neighborhood of +5° F. to −10° F. The mixtures disclosed in this application will not crystallize when maintained at temperatures of +10° F. to −40° F. for as long as 30 days. This characteristic makes such liquids suitable for all outdoor applications of electrical apparatus.

It has been found that for commercial purposes where large volumes of these liquids are employed and moderate power factor is no serious detriment, the following example is quite satisfactory from a cost point of view:

| | Percent by weight |
|---|---|
| A mixture of ethyl-tetrachlorbenzene isomers and ethyl-pentachlorbenzene | 40 |
| Chlorinated diphenyl containing 60% chlorine | 35 |
| Trichlorbenzene isomers | 25 |

Tests of this dielectric liquid reveal that it has a freezing point of about −50° F., a boiling point of 440° F., no fire point, specific gravity of 1.555 at 60° F., viscosity of 50.5″ Saybolt at 100° F. The power factor for 60-cycle alternating current utilizing a copper-iron cell equals .2% at room temperature and about 5% at 80° C.

The chlorinated diphenyl employed in the above last-described dielectric mixture will be largely hexachlordiphenyl isomers, some pentachlordiphenyl isomers and heptachlordiphenyl isomers.

The methods of producing chlorinated diphenyl will not be referred to herein, since they are well known in the art.

In view of the many examples of suitable dielectric liquids given hereinbefore, it is believed that the art will be sufficiently instructed as far as the other freezing point depressors are concerned, if we merely give the characteristics of the materials so as to enable their proper selection.

In employing tertiarybutyl-chlorbenzene isomers, mixtures of butyl-trichlorbenzene isomers and butyl-tetrachlorbenzene isomers and butyl-pentachlorbenzene will be utilized. It is found that mixtures having the following characteristics are suitable:

Boiling range, 270° C. to 328° C.
Fire point, 230° C.
Flash point, around 160° C.
Specific gravity, 1.35 at 40° C.
Chlorine content, 45% by weight to 58% by weight.

In utilizing chlorinated isopropylbenzenes, it has been found that suitable isopropyl-pentachlorbenzene should have a boiling range of 308° C. to 310° C., melting point of about 45° C., flash point over 200° C., no fire point, specific gravity 1.43 at 96° C., chlorine content 60.5%.

Isopropyl-tetrachlorbenzene isomers are also suitable. In selecting the isomers they should have the following characteristics:

Boiling range, 270° C. to 290° C.
Melting point, 10° C.
Flash point, 180° C.
No fire point.
Specific gravity, 1.35 at 96° C.
Chlorine content, 55%.

Mixtures of isopropyl-tetrachlorbenzene isomers and isopropyl-pentachlorbenzene have very desirable characteristics as a depressor. These mixtures should have the following characteristics:

Boiling range, 270° C. to 310° C.
Melting point, 45° C.
Flash point, over 200° C.
No fire point.
Specific gravity, 1.37 at 96° C.
Chlorine content, 57.2%.

Isopropyl-trichlorbenzene isomers employed as a depressor should have the following characteristics:

Boiling range, 250° C. to 253° C.
Melting point, below 40° C.
Flash point, 116° C.
Fire point, 140° C.
Specific gravity, 1.3 at 30° F.
Chlorine content, about 48%.

Another freezing point depressor that has been used with success is amyl-pentachlorbenzene. In using this material it should have the following characteristics:

Boiling range, 165° C. to 185° C. at 10 millimeters pressure.
Melting point, below 0° C.
Flash point, 190° C.
Fire point, over 200° C.
Specific gravity, 1.4 at 20° C.

Amyl-trichlorbenzene and amyl-tetrachlorbenzene isomers make a suitable mixture. In selecting mixtures of these materials, the following characteristics should be observed:

Boiling range, 270° C. to 298° C.
Melting point, below 0° C.
Flash point, about 130° C.
Fire point, 168° C.
Specific gravity, 1.252 at 24° C.
Chlorine content, about 42.2%.

Ethyl-trichlorbenzene isomers have been found suitable when they have the following characteristics:

Boiling range, 240° C. to 250° C.
Melting point, below 40° C.
Flash point, 123° C.
Fire point, 149° C.
Density, 1.34 at 30° C.
Chlorine content, about 51%.

Toluene derivatives have been found suitable as freezing point depressors, trichlortoluene isomers having been found the more satisfactory. In selecting the isomeric mixtures the following characteristics are desirable:

Boiling range, 225° C. to 250° C.
Melting point, 35° C.
No flash point.
Specific gravity, 1.572 at 30° C.
Chlorine content, about 54.6%.

Tetrachlortoluene isomers and pentachlortoluene have also been found to be useful as freezing point depressors.

It will be obvious to those experienced in the art that in using many of the hereinbefore identified freezing point depressors, particularly those that may be classed the lower chlorinated derivatives of isopropylbenzenes, butylbenzenes and amylbenzenes, care must be taken in blending with the base materials such as mixtures of ethyl-tetrachlorbenzene and ethyl-pentachlorbenzene, or of these materials mixed with chlorinated diphenyl, to obtain a fire-proof dielectric. In other words, the chlorine content of the final dielectric mixture should be 50% or over and the constituents should be so selected that the partial pressures shall be such that the vapors given off on heating will not support combustion or be substantially incombustible.

In preparing our dielectric liquids, many tests have been made to ascertain the characteristics of mixtures of ethyl-tetrachlorbenzene and ethyl-pentachlorbenzene. It has been found that the gases evolved as a result of the electrical decomposition of this base liquid are substantially incombustible.

This could not be arrived at from a study of the molecular structure of the ingredients, since in ethyl-tetrachlorbenzene there are two hydrogen atoms in excess of the chlorine atoms. This would suggest that on decomposition there would be more hydrogen given off than chlorine and the gas would be readily combustible, but this is not the case since tests have shown that the gases are substantially incombustible. A complete explanation of this phenomenon is not essential to the present disclosure but it is thought that the structure of the molecule is such that on decomposition by an electric arc, the atoms are so re-arranged that the gases given off are substantially incombustible.

The power factor of the dielectric liquid and its ingredients was determined by tests and the results give an accurate concept of the electrical characteristics and indicate the purposes for which different mixtures of the dielectric liquid may be utilized. The following table gives the results of our tests:

POWER FACTOR OF DIELECTRIC LIQUIDS

*Tests made on 60-cycle current*

|  | Power factor at— | |
| --- | --- | --- |
|  | 25° C. | 80° C. |
|  | *Percent* | *Percent* |
| 30% ethyl-pentachlorbenzene | Less than .1 | 2 to 3 |
| 20% ethyl-tetrachlorbenzene isomers |  |  |
| Chlorinated diphenyl isomers | Less than .1 | 2 to 4 |
| Isopropyl-trichlorbenzene | 1 to 2 | 16 |
| Aryltrichlortetralin | 1 to 2 | 6 to 40 |
| Trichlorbenzene isomers | 10 to 40 | 60 to 80 |
| 40% ethyl-pentachlorbenzene |  |  |
| 10% ethyl-tetrachlorbenzene isomers | Less than .1 | 2 to 4 |
| 50% chlorinated diphenyl isomers |  |  |

Figure 8:
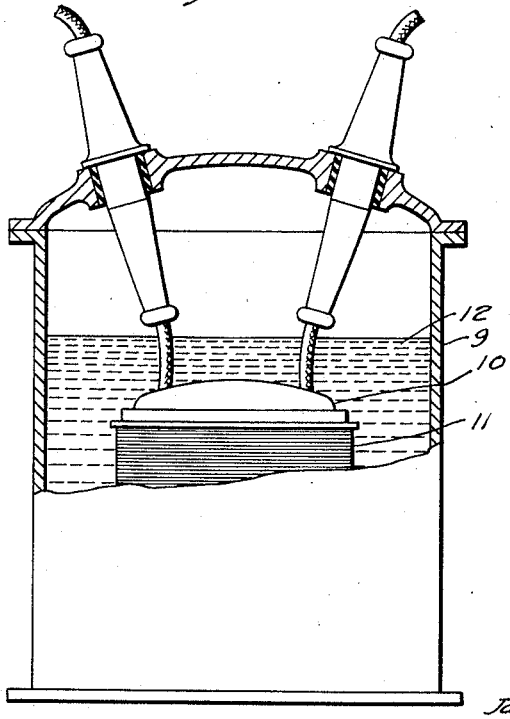
Fig. 8 is a view partly in side elevation and partly in section showing the manner in which the coils and core of a transformer are immersed in the dielectric liquid.
Figure 9:
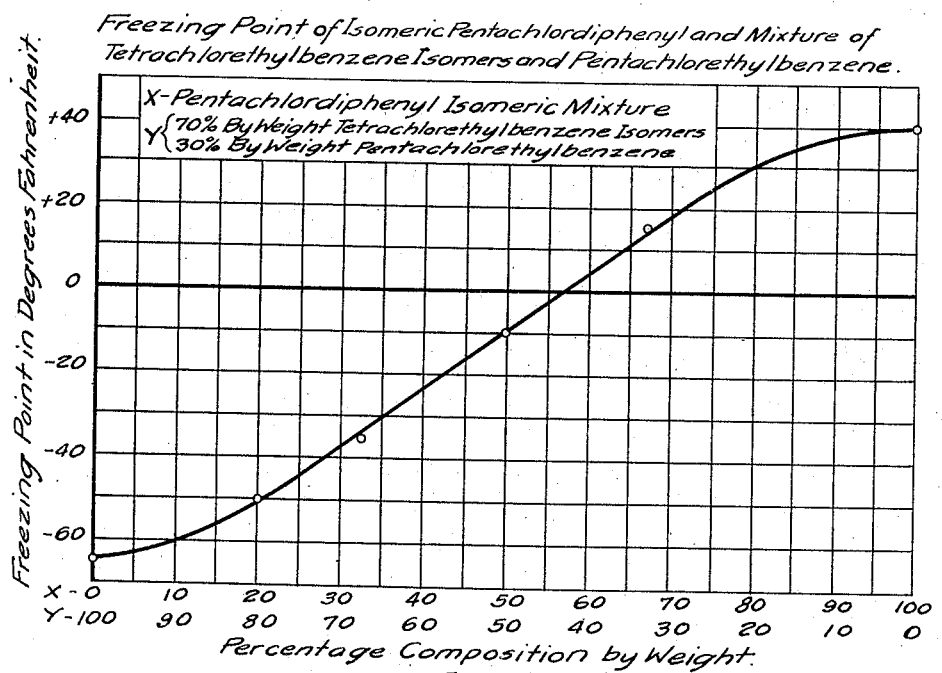
Fig. 9 is a graph showing how the freezing point of the dielectric liquid comprising ethyl-tetrachlorbenzene isomers, ethyl-pentachlorbenzene and pentachlordiphenyl isomers changes as the proportions of the ingredients are varied.
Figure 10:
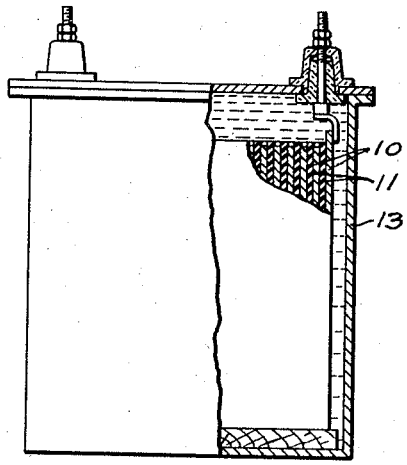
Fig. 10 is a view in side elevation of a capacitor built in accordance with this invention and having parts broken away showing details of the construction.

In the manufacture of electrical apparatus which employs dielectric liquids, some means for retaining it in cooperative relation with the conductors is provided. An example is found in transformers, see Fig. 8, which shows a casing 9 with a core 10 carrying coils 11 disposed therein in accordance with standard practice. A sufficient amount of a suitable dielectric liquid 12 to completely immerse the coils 11 of the transformer is provided. The dielectric liquid affords adequate protection in case of an electrical failure and arcing.

In transformers the dielectric liquid is utilized primarily for effecting a transfer of heat to keep the transformer coils and the core below a predetermined temperature. In order to limit the volume of dielectric liquid employed, it may be circulated by any of the well known methods commonly employed in this art.

In selecting the dielectric liquid for a transformer consideration will be given to the conditions under which the transformer is to be operated. If the transformer is to be employed in a sub-station where the temperatures do not drop excessively, a dielectric liquid containing ethyl-tetrachlorbenzene, ethyl-pentachlorbenzene and chlorinated diphenyl may be satisfactory. In case the transformer is to be used outside in a climate where it will be exposed to temperatures as low as zero Fahrenheit, some suitable freezing point depressor such as aryltrichlortetralin, trichlorbenzene and the chlorinated alkyl derivatives of benzene will be added to the dielectric mixture.

The treating of capacitors and cables with the dielectric liquids disclosed hereinbefore involves a slightly different problem from that of their use in transformers, reactors, regulators and circuit breakers. In capacitors, cables and other similar electrical equipment, the dielectrics are generally employed for the fireproofing of the insulating or dielectric materials utilized in building the apparatus.

In the construction of capacitors, the plates 10, made of some suitable conducting material such as aluminum foil, and the like, are separated by sheets 11 of insulation or dielectric material. Paper is the material most generally used as a dielectric or insulation between the plates 10. In the present invention, the capacitors are fireproofed by treating the paper insulation or solid dielectric with a dielectric liquid which is non-inflammable and which when decomposed gives off a substantially incombustible gas. The problem of fire-proofing cables is somewhat similar to that of fire-proofing capacitors.

Figure 11:
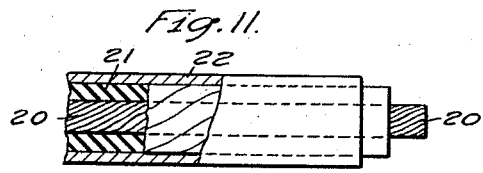
Fig. 11 is a view in side elevation of a section of a cable constructed in accordance with this invention and having parts broken away to show details of the structure.

Referring to Fig. 11, a cable comprising a conductor 20 which has applied thereto some suitable insulating material 21, such as a paper wrapping, is shown. Around the paper insulation a lead sheath 22 is sometimes applied for protecting the insulation. Other wrappings may be applied to the cable in accordance with the general practice, and will not be described herein since such practice is well known in the art and is no part of the present invention.

If the paper insulation, which is the equivalent of the paper dielectric in the capacitors, is not fire-proofed and an arc is caused by some disturbance in the electrical system in which the cable may be employed, a portion of the cable is likely to be burned out with possible damage to other apparatus and property.

In the present invention, the paper insulation or dielectric employed in both capacitors and cables is fire-proofed, by treating it with a liquid dielectric comprising ethyl-tetrachlorbenzene, ethyl-pentachlorbenzene and chlorinated diphenyl. The proportions of the ingredients will vary with the conditions to which the electrical apparatus may be subjected.

In the manufacture of capacitors, if a low resonance temperature or extremely low freezing point is desired, the base liquid will be prepared with a high proportion of ethyl-tetrachlorbenzene isomers. If the objective in preparing the base liquid is a low power factor without regard to the freezing point, the amount of ethyl-pentachlorbenzene employed will be high. In preparing the base liquid for most applications, about 20% to 40% by weight ethyl-tetrachlorbenzene isomers is mixed with about 80% to 60% by weight ethyl-pentachlorbenzene. A base liquid containing these percentages is the most economical to prepare. Further, such mixtures have good electrical characteristics and a freezing point suitable for ordinary applications.

In manufacturing capacitors or cables, the treating of the insulation, that is, the paper or the like disposed between the plates of the capacitor or the wrapping carried by the conductor in cables, all the air is pumped out of the material to be treated and the dielectric liquid applied to the insulation under vacuum in any manner well known in the art to completely impregnate it. In the case of capacitors, when the insulation or paper disposed between the plates has been sufficiently treated, the capacitor case is sealed.

The desirable characteristics of our dielectric which adapts it for use in capacitors may be best understood by reference to Fig. 12, which gives the power factor of the dielectric employed at different temperatures for different percentages of the ingredients. When a capacitor has been properly treated with a dielectric liquid comprising about 40% by weight ethyl-tetrachlorbenzene and ethyl-pentachlorbenzene mixed in the ratio 30:70 and about 60% by weight chlorinated diphenyl, the peak in power factor does not occur until the temperature has fallen to about −26° F. As shown in Fig. 12, when the specific inductive capacity of the capacitor begins to fall off appreciably, the power factor rises abruptly. The temperature at which the specific inductive capacity begins to fall off rapidly is called the resonance temperature.

Since the efficiency of the capacitor varies directly with the specific inductive capacity, it does not begin to decrease until the temperature falls to about −20° F. This is of importance in many applications of such apparatus. In the case of capacitors impregnated with our dielectric, when they are connected into electrical systems which are exposed to atmospheric temperatures, the system is not thrown out of resonance unless the temperature falls below about −20° F. Such a temperature is seldom imposed on capacitors.

Referring to Fig. 13, it is noted that a resonance temperature of about −55° F. may be obtained by mixing the ingredients of the dielectric liquid in the proper proportions. A mixture comprising 22.5% ethyl-tetrachlorbenzene isomers, 52.5% ethyl-pentachlorbenzene and 25% pentachlordiphenyl isomers has a resonance temperature of about −55° F. There appears to be a definite relationship between the freezing point and the resonance temperatures of the mixtures. This enables the preparation of mixtures having resonance temperatures as low as about −70° F. to −80° F., which is lower than is normally required. A number of specific examples of the mixtures of our dielectric liquid which have desirable characteristics are as follows:

| | Per cent by weight |
|---|---|
| Ethyl-tetrachlorbenzene isomers | 15 |
| Ethyl-pentachlorbenzene | 35 |
| Pentachlordiphenyl isomers | 50 |

This mixture has a freezing point of +5° F., a flash point at 355° F., boils at 610° F., no fire point, power factor of .03% at room temperature and 60-cycle current, and a resonance temperature of −35° F.

| | Per cent by weight |
|---|---|
| Ethyl-tetrachlorbenzene isomers | 18 |
| Ethyl-pentachlorbenzene | 42 |
| Pentachlordiphenyl isomers | 40 |

This mixture of the dielectric will stand lower temperatures and be more suitable for applications of apparatus to be made in cold climates. It has a freezing point of −5° F., a flash point of 355° F., boils at 600° F., will not burn, has a power factor of .03% at room temperature for 60-cycle current, and a resonance temperature of −45° F.

Another mixture of our dielectric which is suitable for a cold climate comprises:

| | Per cent by weight |
|---|---|
| Ethyl-tetrachlorbenzene isomers | 21 |
| Ethyl-pentachlorbenzene | 49 |
| Pentachlordiphenyl isomers | 30 |

The freezing point of this mixture is about −10° F. It has a flash point of 355° F., boils at 590° F., and will not burn. The power factor at room temperature and 60-cycle current is about .04% and the resonance temperature is −55° F.

Another good mixture which has a slightly higher power factor comprises:

| | Per cent by weight |
|---|---|
| Ethyl-tetrachlorbenzene isomers | 35 |
| Ethyl-pentachlorbenzene | 15 |
| Pentachlordiphenyl isomers | 50 |

The freezing point for this liquid is about −10° F. It has a flash point of 315° F., boils at 545° F. but will not burn. The power factor at room temperature and for 60-cycle current is .08% and the resonance temperature about −50° F.

If a very low resonance temperature is desired, we may employ a mixture comprising:

| | Per cent by weight |
|---|---|
| Ethyl-tetrachlorbenzene isomers | 50 |
| Pentachlordiphenyl isomers | 50 |

This mixture gives a freezing point −20° F., a flash point of 310° F., boils at 540° F., but will not burn. The power factor at room temperature for 60-cycle current is .1% and the resonance temperature is about −60° F.

The provision of capacitors having a substantially constant inductive capacity over a wide range of temperatures which extends well below 0° F. enables the efficient operation of systems which ordinarily are rendered ineffective by sub-zero weather. A good example is railway signal systems. Heretofore when such systems were subjected to cold winter weather, the specific inductive capacities of the capacitors employed would change greatly with sub-zero temperatures and the circuits were thrown out of resonance and rendered inoperative. With the present capacitors, since the specific inductive capacities remain substantially constant over a range of temperatures which extends well below those ordinarily experienced, there is little danger of the circuits failing to perform their functions in the coldest winter weather.

The curve 23 of Fig. 12 for a dielectric mixture containing 40% by weight ethyl-tetrachlorbenzene and ethyl-pentachlorbenzene and 60% by weight of chlorinated diphenyl reveals that the power factor of the dielectric liquid for 60-cycle current is approximately .02% for a temperature range from 100° F. + to 0° F. The specific inductive capacity continually increases from about 200° F. down to approximately −20° F. The change of the specific inductive capacity in this range is very small, varying from about 4.2 to 5.6. The capacity of the capacitor at the different temperatures varies directly with the specific inductive capacity. Thus over this wide range of temperatures from 200° F., to −20° F., the capacity of the condenser varies very little, and it will not throw any electric circuit in which it may be connected out of resonance and cause it to fail.

In the case of cables, the change in the specific inductive capacity is not of any great importance. However, the dielectric liquid, because it can withstand low and high temperatures without undergoing any noticeable change, particularly in power factor, is highly desirable. The dielectric liquid, if subjected to an arc, gives off substantially incombustible gases and prevents the occurrence of fires when the cable is employed in buildings, tunnels and the like.

When the term "substantially incombustible" is used in this application, we mean that when the dielectric liquid is employed in electrical apparatus and is decomposed electrically by an arc and the gases of decomposition mixed with air, generally, they will not burn, but if they are ignited at a point of high temperature, flame propagation will be very slow and will not result in detonation because the major volume of the gas will not support combustion.

In the specification and claims, the term ethyl-tetrachlorbenzene means either one or more of its isomers.

In the specification and claims, the term freezing point means the temperature at which the crystal growth prevents free flow of the material.

In this specification and claims, the term aryltrichlortetralin is employed to designate that three chlorine atoms are bonded to the carbon atoms in the ring structure.

Since certain changes may be made in the above mixtures, and different embodiments of the invention could be made without departing from the scope thereof, it is intended that all matter contained in the above description or taken in connection with the accompanying drawings shall be interpreted as illustrative and not in a limiting sense.

We claim as our invention:

1. A dielectric liquid for electrical apparatus comprising ethyl-tetrachlorbenzene, ethylpentachlorbenzene and chlorinated diphenyl.

2. A dielectric liquid for electrical apparatus comprising ethyl-tetrachlorbenzene, ethylpentachlorbenzene, chlorinated diphenyl and as a freezing point depressor a predetermined quantity of isopropyl-trichlorbenzene.

3. A dielectric liquid for electrical apparatus comprising ethyl-tetrachlorbenzene, ethylpentachlorbenzene, chlorinated diphenyl and as a freezing point depressor a predetermined quantity of aryltrichlortetralin.

4. A dielectric liquid for electrical apparatus consisting from 20% to 80% by weight, a mixture of ethyl-tetrachlorbenzene and ethyl-pentachlorbenzene and from 80% to 20% by weight, chlorinated diphenyl.

5. A dielectric liquid for electrical apparatus consisting from 40% to 60% by weight, a mixture of ethyl-tetrachlorbenzene and ethyl-pentachlorbenzene and from 60% to 40% by weight chlorinated diphenyl, said chlorinated diphenyl containing from 45% to 65% by weight chlorine.

6. A dielectric liquid for electrical apparatus comprising ethyl-tetrachlorbenzene and chlorinated diphenyl.

7. A dielectric liquid for electrical apparatus consisting from 80% to 20% by weight ethyl-tetrachlorbenzene and from 20% to 80% by weight chlorinated diphenyl.

8. The method of insulating a conductor from a casing which comprises interposing a dielectric between the conductor and casing, the dielectric comprising ethyl-tetrachlorbenzene, chlorinated diphenyl containing 45% to 65% by weight chlorine, and a dielectric miscible organic freezing point depressor.

9. The method of insulating a conductor from a casing which comprises interposing a dielectric between the conductor and casing, the dielectric comprising ethyl-tetrachlorbenzene, ethyl-pentachlorbenzene and chlorinated diphenyl.

10. A dielectric liquid for electrical apparatus comprising ethyl-tetrachlorbenzene, ethyl-pentachlorbenzene, chlorinated diphenyl and at least one of the group of freezing point depressors consisting of isopropyl-trichlorbenzene, aryl-trichlortetralin, trichlortoluene and trichlorbenzene.

11. A dielectric liquid for electrical apparatus comprising ethyl-tetrachlorbenzene, chlorinated diphenyl containing from 45% to 65% by weight chlorine and at least one of the group of freezing point depressors consisting of isopropyl-trichlorbenzene, aryl-trichlortetralin, trichlortoluene and trichlorbenzene.

12. A dielectric liquid for electrical apparatus comprising 30% to 60% by weight of a mixture of ethyl-tetrachlorbenzene and ethyl-pentachlorbenzene, the mixture consisting of from 20% to 80% by weight ethyl-tetrachlorbenzene and 80% to 20% by weight, ethyl-pentachlorbenzene, 60% to 25% by weight chlorinated diphenyl containing chlorine in amounts from 50% to 68% by weight and as a freezing point depressor 10% to 15% by weight trichlorbenzene.

13. A dielectric liquid for electrical apparatus consisting of 30% to 50% by weight of a mixture of ethyl-tetrachlorbenzene and ethyl-pentachlorbenzene, the mixture consisting of 20% to 80% by weight ethyl tetrachlorbenzene and 80% to 20% by weight ethyl-pentachlorbenzene, 60% to 20% by weight chlorinated diphenyl containing from 50% to 68% by weight of chlorine and 10% to 30% by weight of at least one of the group of freezing point depressors consisting of isopropyl-trichlorbenzene, trichlorbenzene, trichlortoluene and aryl-trichlortetralin.

14. The method of insulating a conductor from a casing which comprises interposing a dielectric between the conductor and casing the dielectric consisting of a mixture of ethyl-tetrachlorbenzene, ethyl-pentachlorbenzene, chlorinated diphenyl containing from 45% to 65% by weight chlorine and at least one of the group of freezing point depressants consisting of isopropyl-trichlorbenzene, trichlortoluene, trichlorbenzene and aryl-trichlortetralin.

15. The method of insulating a conductor from a casing which comprises interposing a dielectric between the conductor and casing, a dielectric consisting of 30% to 60% of a mixture of ethyl-tetrachlorbenzene and ethyl-pentachlorbenzene, 60% to 25% by weight chlorinated diphenyl containing from 45% to 65% by weight chlorine and as a freezing point depressor 10% to 15% by weight trichlorbenzene.

16. A method of insulating a conductor, the different parts of which when energized have different potentials causing an electrostatic field which comprises applying a solid material to the conductor and treating the solid material with a mixture comprising ethyl-tetrachlorbenzene, ethyl-pentachlorbenzene and chlorinated diphenyl.

17. The method of insulating a conductor, the different parts of which when energized have different potentials causing an electrostatic field which comprises applying an absorbent material to the conductor and treating the solid material with a mixture comprising ethyl-tetrachlorbenzene, ethyl-pentachlorbenzene and chlorinated diphenyl.

18. The method of insulating a conductor, the different parts of which when energized have different potentials causing an electrostatic field which comprises applying a paper to the conductor and treating the paper with a liquid mixture comprising ethyl-tetrachlorbenzene, ethyl-pentachlorbenzene and chlorinated diphenyl.

19. The method of insulating a cable provided with a conductor and a solid insulating material, the different parts of the conductor when energized having different potentials causing an electrostatic field which comprises treating the solid insulating material with a mixture of 20% to 80% by weight of a mixture of ethyl-tetrachlorbenzene, ethyl-pentachlorbenzene and 80% to 20% by weight of chlorinated diphenyl.

20. The method of insulating a capacitor provided with a plurality of spaced conductors which when energized have different potentials causing an electrostatic field which comprises interposing between said conductors a mixture of ethyl-tetrachlorbenzene, ethyl-pentachlorbenzene and chlorinated diphenyl.

21. The method of insulating a capacitor provided with a plurality of conductors which when energized have different potentials and which are separated by a solid dielectric which comprises treating the solid dielectric with a mixture of ethyl-tetrachlorbenzene, ethyl-pentachlorbenzene and chlorinated diphenyl.

22. The method of insulating a plurality of conductors which when energized have different potentials causing an electrostatic field which comprises interposing between the conductors a porous paper and treating the porous paper with a mixture of 20% to 80% by weight ethyl-tetrachlorbenzene and 80% to 20% by weight chlorinated diphenyl.

23. The method of insulating a condenser provided with a plurality of conductors spaced apart and having interposed therebetween a solid porous dielectric, the conductors being disposed to have when energized different potentials causing an electrostatic field which comprises treating the solid porous dielectric with a mixture of 20% to 80% by weight ethyl-tetrachlorbenzene and ethyl-pentachlorbenzene, the mixture consisting of 20% to 80% by weight of ethyl-tetrachlorbenzene and 80% to 20% by weight of ethyl-pentachlorbenzene and chlorinated diphenyl.

24. A dielectric liquid for electrical apparatus which consists of 30% to 50% by weight of a mixture of ethyl-tetrachlorbenzene and ethyl-pentachlorbenzene, the mixture consisting of 20% to 80% by weight ethyl-tetrachlorbenzene and 80% to 20% by weight ethyl-pentachlorbenzene, 60% to 20% by weight chlorinated diphenyl containing from 50% to 68% by weight of chlorine, and 10% to 30% by weight trichlorbenzene.

25. A dielectric liquid for electrical apparatus consisting of about 40% by weight ethyl-tetrachlorbenzene and ethyl-pentachlorbenzene, the mixture consisting of 20% to 80% by weight ethyl-tetrachlorbenzene, 80% to 20% by weight ethyl-pentachlorbenzene, about 30% by weight chlorinated diphenyl, containing from 50% to 68% by weight of chlorine, and about 25% by weight trichlorbenzene isomers.

26. A dielectric liquid for electrical apparatus, comprising, ethyl-tetrachlorbenzene, chlorinated diphenyl and at least one of the group consisting of trichlorbenzene, aryl-trichlortetralin, trichlortoluene and isopropyl-trichlorbenzene for depressing the freezing point.

27. In a dielectric liquid for electrical apparatus, in combination, a nuclear chlorinated monoalkyl derivative of benzene containing not more than 7 carbon atoms in the saturated alkyl side-chain, chlorinated diphenyl and at least one of the group of freezing point depressors consisting of trichlorbenzene, isopropyl-trichlorbenzene, trichlortoluene and aryl-trichlortetralin.

28. The method of insulating a conductor from a casing which comprises interposing a dielectric material between the conductor and casing, the dielectric material comprising a nuclear chlorinated mono-alkyl derivative of benzene containing not more than 7 carbon atoms in the alkyl side-chain, chlorinated diphenyl, and at least one of the group of freezing point depressors consisting of trichlorbenzene, isopropyl-trichlorbenzene, trichlortoluene and aryl-trichlortetralin.

29. In a dielectric liquid for electrical apparatus, in combination, a nuclear chlorinated monoalkyl derivative of benzene containing not more than 7 carbon atoms in the saturated alkyl sidechain and chlorinated diphenyl.

30. The method of insulating a conductor from a casing which comprises, interposing a dielectric material comprising a nuclear chlorinated monoalkyl derivative of benzene containing not more than 7 carbon atoms in the saturated alkyl sidechain and chlorinated diphenyl.

JAMES G. FORD.
CHARLES F. HILL.